United States Patent [19]
Bostrom

[11] Patent Number: 5,156,639
[45] Date of Patent: Oct. 20, 1992

[54] RAILWAY MAINTENANCE VEHICLE
[75] Inventor: Jeffrey A. Bostrom, Moline, Ill.
[73] Assignee: Deere & Company, Moline, Ill.
[21] Appl. No.: 793,915
[22] Filed: Nov. 18, 1991
[51] Int. Cl.5 .............................................. B61C 11/00
[52] U.S. Cl. .................................................. 105/72.2
[58] Field of Search .............................. 104/6, 9, 5, 2; 105/72.2, 215.2

[56] References Cited
U.S. PATENT DOCUMENTS

| | | | |
|---|---|---|---|
| 2,006,781 | 7/1935 | Winkley | 105/72.2 |
| 3,638,579 | 2/1972 | Yard | 105/72.2 |
| 3,780,664 | 12/1973 | Holley et al. | 104/6 |
| 4,392,433 | 7/1983 | Nyland | 104/6 |
| 4,537,137 | 8/1985 | White | 105/72.2 |

OTHER PUBLICATIONS
Progressive Railroading, pp. 150–1545, received Jan. 26, 1991.
Fairmont, A Division of Harsco Corporation, "W127 Series A, MoveRoo Tie Remover/Inserter", Bulletin #1064B, Jul. 1989.
Fairmont, A Division of Harsco Corporation, "Make the Most of Your Time Between Times", received Jan. 28, 1991.

Primary Examiner—Robert J. Oberleitner
Assistant Examiner—Mark T. Le

[57] ABSTRACT

A loader backhoe having a rear railgear assembly wherein the rear railgear assembly comprises two rail engaging wheels, a stationary frame having a cantilevered portion, a pivotable axle to which the rail engaging wheels are attached, and a hydraulic cylinder positioned between the cantilevered member and the pivotable axle. The stationary frame is bolted to the rear axle. The rail engaging wheels are pivoted from a storage position located between the front and rear wheels of the loader backhoe to a rail engaging position located behind the rear wheels. The dipperstick of the backhoe is provided with a grapple attachment for grabbing ties and removing them in a perpendicular motion.

5 Claims, 5 Drawing Sheets

RAILWAY MAINTENANCE VEHICLE

BACKGROUND OF THE INVENTION

1. Field of the Invention

The present invention is directed to a railway maintenance vehicle that can be operated both on and off rails and which removes ties perpendicular to the rails.

2. Description of the Prior Art

Railroads are an important cog in the transportation system. Trains ride on prepared railbeds having rails that are anchored to cross ties. The ties are ballasted in the railbed by loose rock and other fill material. From time to time maintenance operations must be carried out on the tracks to insure their continued reliability and efficiency.

Typically special work vehicles are employed to maintain tracks. These vehicles maybe conventional work vehicles outfitted with rail gear or specialized machines. As railways maybe located in remote areas it is desirable that maintenance vehicles be able to ride on the rails. It is also desirable that the vehicles perform more than one function. For example loader backhoes have been adapted for railway travel and use. Such vehicles are provided with two sets of wheels: a first conventional set for moving the loader backhoe on the ground; and a second set for moving the loader backhoe on rails.

SUMMARY

It is an object of the present invention to provide a system for readily adapting a loader backhoe to a railway maintenance vehicle.

It is another object of the present invention to provide a procedure for removing and replacing ties using a loader backhoe.

The loader backhoe of the present invention is provided with conventional railway adaptable front wheels that extend downwardly to engage the rails and lift the front wheels off the track. The rear rail engaging wheels are normally stored in front of the rear wheels and rotated downwardly and rearwardly to engage the rails. The rear wheels still engage the track and are used for propelling the loader backhoe along the track.

In removing ties the rear of the loader backhoe is positioned opposite the ties to be removed. Rail clamps clamp the rails and stabilizer legs are lowered engaging opposite sides of the railbed. Spikes holding the ties to the rail are removed. The stabilizer legs are then further extended lifting the vehicle, the rail clamps, and rails upwardly. A grapple attachment mounted to the dipperstick of the backhoe then clamps the ties. By rotating the attachment the cross ties are pulled out perpendicular to the rails. After the old tie has been removed a new tie can be inserted into the vacated space.

DETAILED DESCRIPTION

Figure 1:
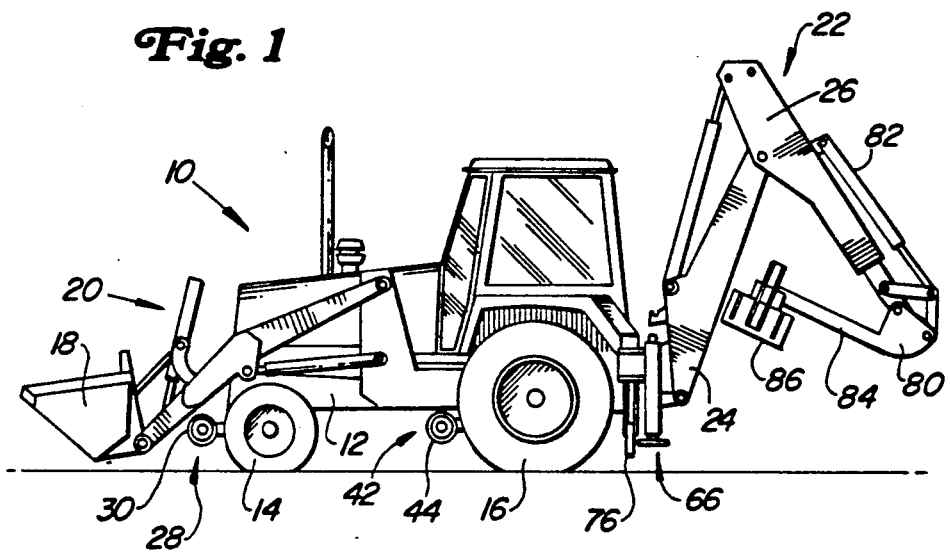
FIG. 1 is a side view of a loader backhoe of the present invention adapted to non-rail applications.
Figure 2:
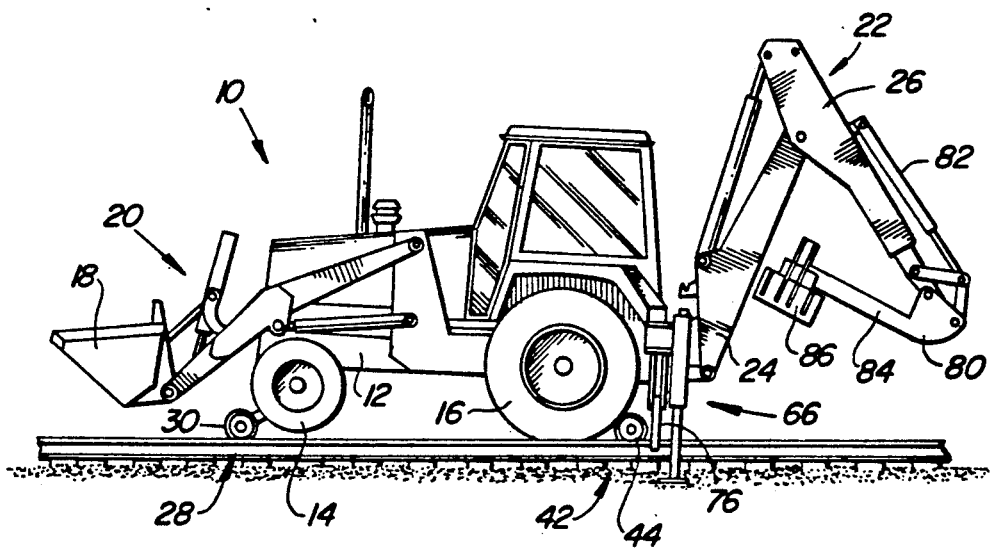
FIG. 2 is a side view of a loader backhoe of the present invention adapted to rail applications.

FIGS. 1 and 2 illustrate a conventional loader backhoe 10. The loader backhoe comprises a supporting structure 12 having a first pair of ground engaging wheels 14 and a second pair of ground engaging wheels 16. The first pair of ground engaging wheels 14 are steerable wheels used for steering the vehicle in non-rail applications. The second pair of wheels are the main drive wheels and are used for propelling the vehicle. The loader backhoe maybe provided with a mechanical front wheel drive option so the front wheels can provide extra traction.

The front of the loader backhoe is provided with a loader bucket 18 operatively coupled to the supporting structure by linkage 20. The loader backhoe is also provided with a backhoe 22 having a boom 24 and an extendible dipper stick 26. The loader backhoe is relatively conventional being a 310D marketed by the assignee of the present patent application and having an extendible dipperstick option.

The front of the loader backhoe is provided with a first or front railgear assembly 28 which is of a relatively conventional configuration. The front rail gear comprises two rail engaging wheels 30 that are mounted to a first rail gear axle 32. The rail gear axle 32 is provided with two arms 33 that are pivotally mounted to stationary frame 34 at pivot point 35. Frame 34 is bolted to axle 36 by bolts 37. Steerable wheels 14 are mounted to axle 36. A pair of hydraulic cylinders 38 are also mounted to stationary frame 34. The piston end of the hydraulic cylinder is coupled to triangular link 39 which is pivotally mounted to stationary frame 34 at pivot point 40. An overcenter toggle link 41 extends between triangular link 39 and axle arm 33 for holding the front rail gear in a rail engaging configuration.

When changing the loader backhoe from a non-rail configuration to a rail configuration, the operator extends hydraulic cylinders 38 rotating the axle 32 and associated wheels 30 downwardly into contact with the rails. Continued downward movement lifts the front wheels 14 off the track as the wheels 30 fully engage the rails. The overcenter linkage locks the wheels in place. To change the machine from a rail configuration to a non-rail configuration, the process is reversed and the hydraulic cylinders 38 are retracted.

The second or rear railgear assembly 42 comprises two rail engaging wheels 44 that are mounted to a second railgear axle 46. The second rail gear axle 46 is provided with two arms 48 that are pivotally coupled to stationary frame 50. Stationary frame 50 is mounted to axle 52 by bolts 54. The main drive wheels 16 are secured to axle 52. The stationary frame is provided with cantilevered portion 56 that extends rearward of the axle 52 and to which is mounted two hydraulic cylinders 58. Hydraulic cylinders 58 are mounted between the cantilevered portion 56 of frame 50 and pivotable arms 48.

The cantilevered portion 56 is provided with a snubber 60. The top of the snubber contacts the underside of the supporting structure 12 of the loader backhoe transferring the wheel load from the wheels 44 through arms 48 to the supporting structure. To further aid in this effort, the pivotable arms 48 are provided with a stop block 62 that contacts a downwardly depending portion 64 of the cantilevered portion 56, when the rear railgear is in its rail configuration.

Figure 3:
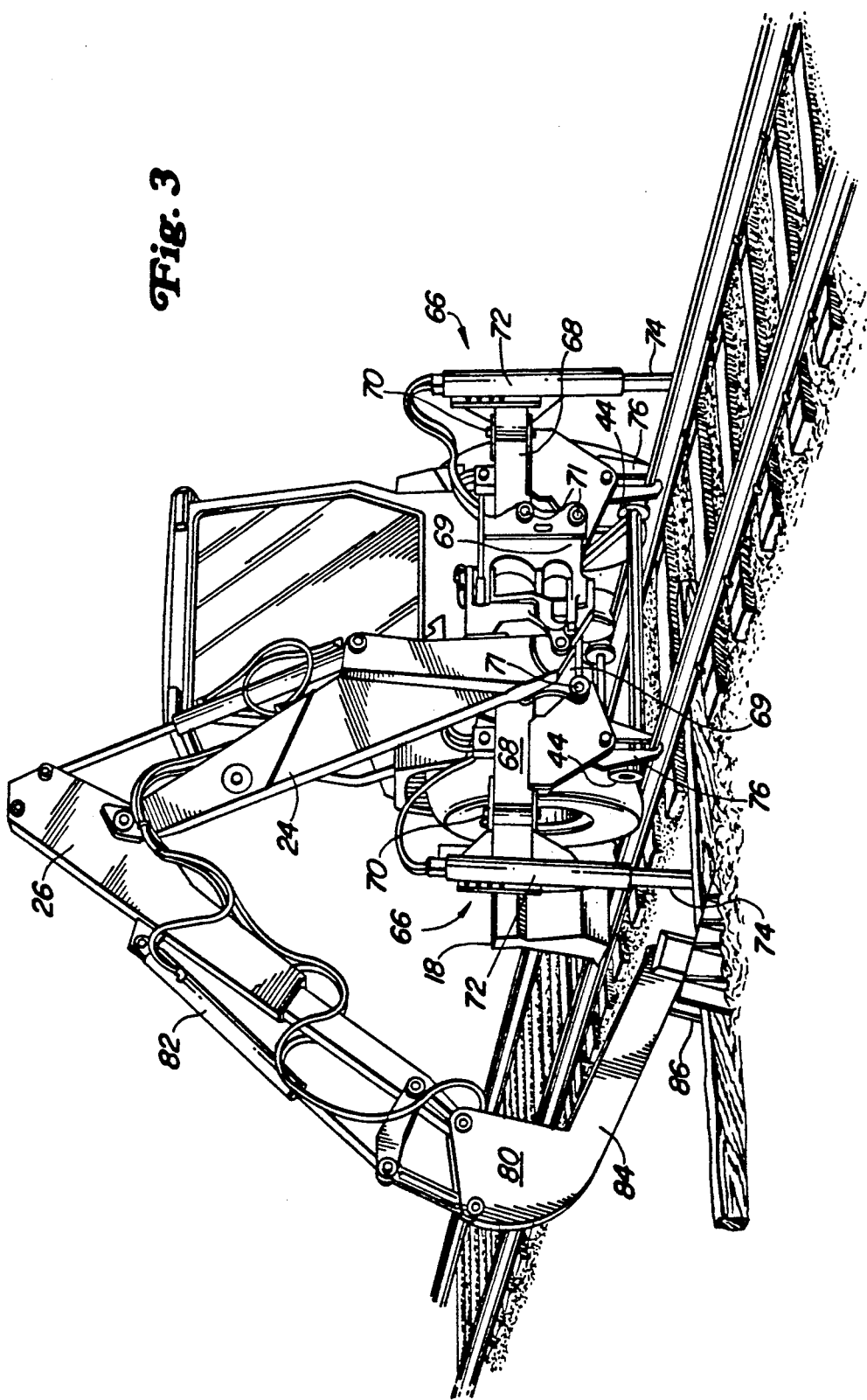
FIG. 3 is a perspective rear view of the loader backhoe removing a cross tie from a railbed.
Figure 4:
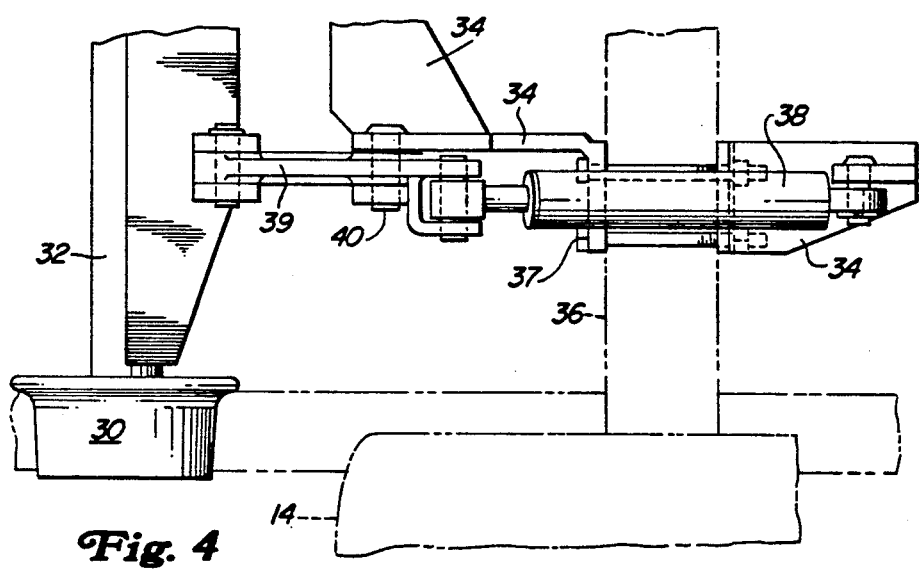
FIG. 4 is a top view of the front rail gear.
Figure 5:
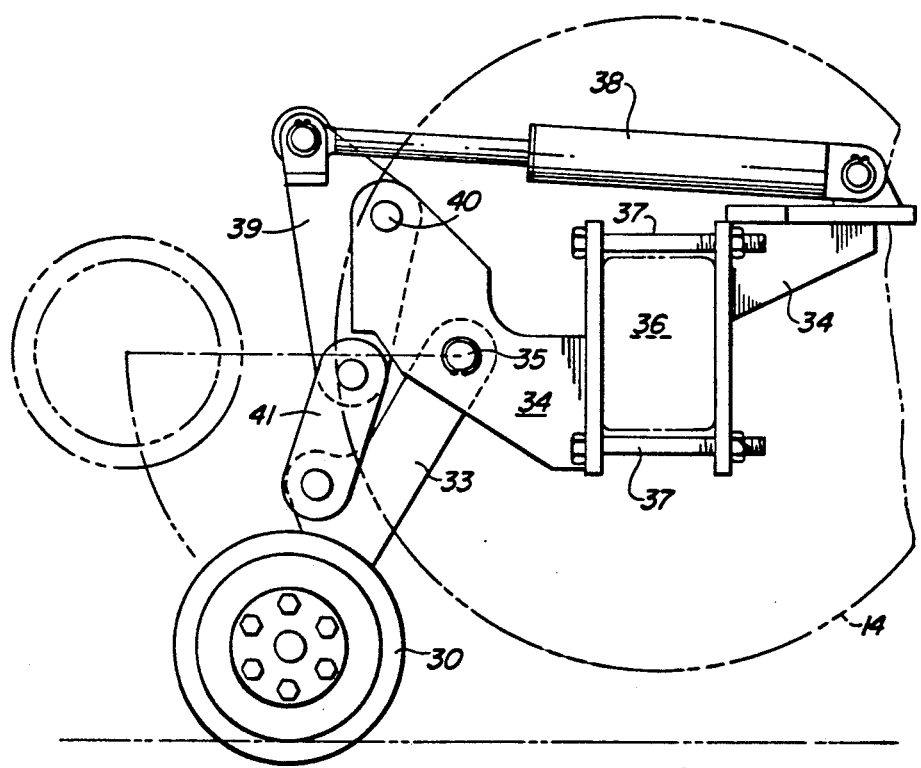
FIG. 5 is a side view of the front rail gear.
Figure 6:
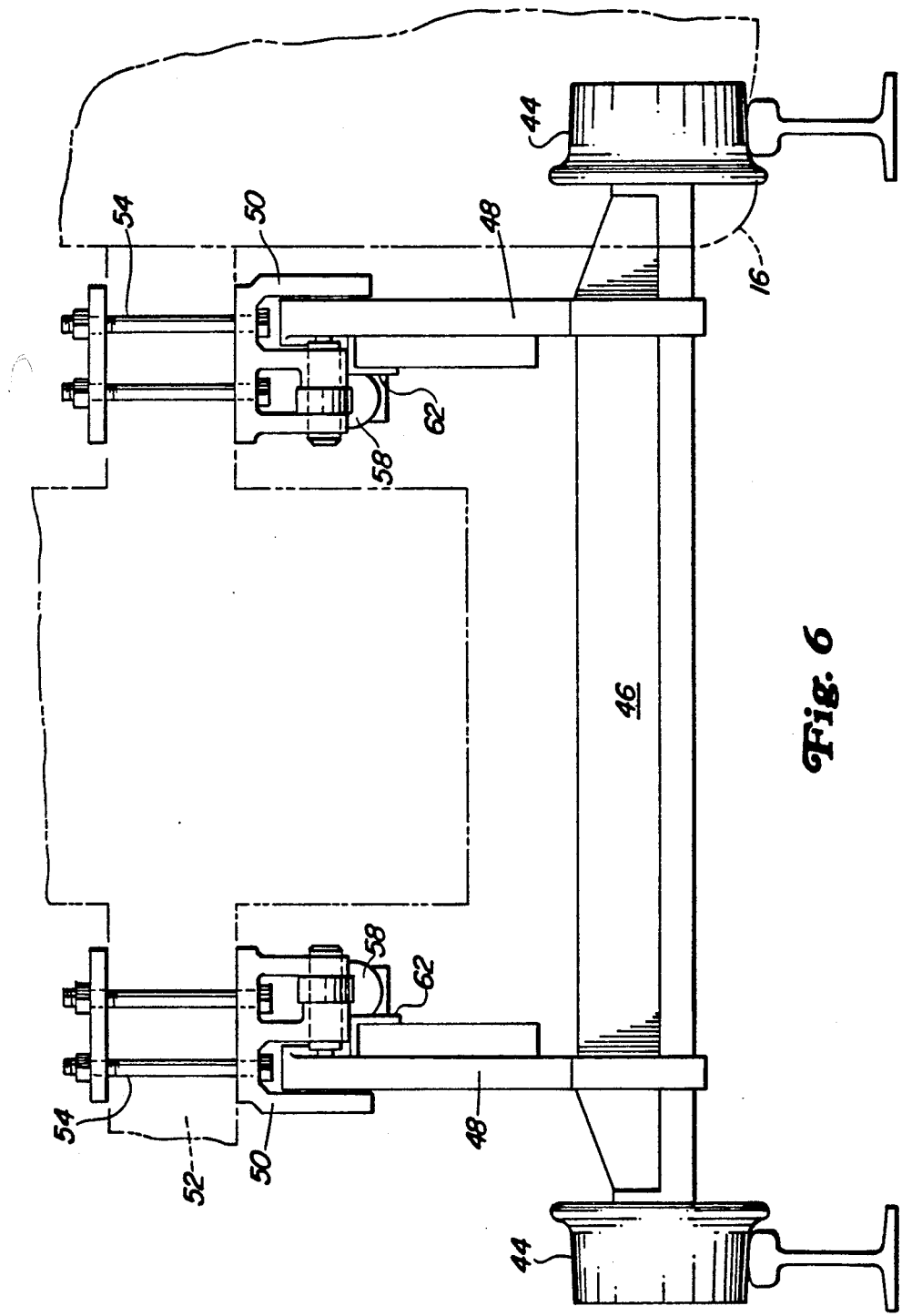
FIG. 6 is a rear view of the rear rail gear.

The rear of the loader backhoe is best illustrated in FIG. 3. The rear of the loader backhoe is provided with stabilizer legs 66. The stabilizer legs are pivotally mounted to frame 68 by vertical pivots 70. The frame is mounted at points 69 to the cradle 71 of the backhoe in place of more conventional stabilizer legs. The vertical pivots allow the stabilizers to be swung alongside the machine during transport and outwardly during a work operation. The stabilizers are provided with vertical hydraulic cylinders 72 for extending legs 74 during a work operation.

Also secured to frame 68 are two rail clamps 76 which are used for clamping the rails during a work operation. The rail clamps are also driven by hydraulic cylinders.

Figure 7:
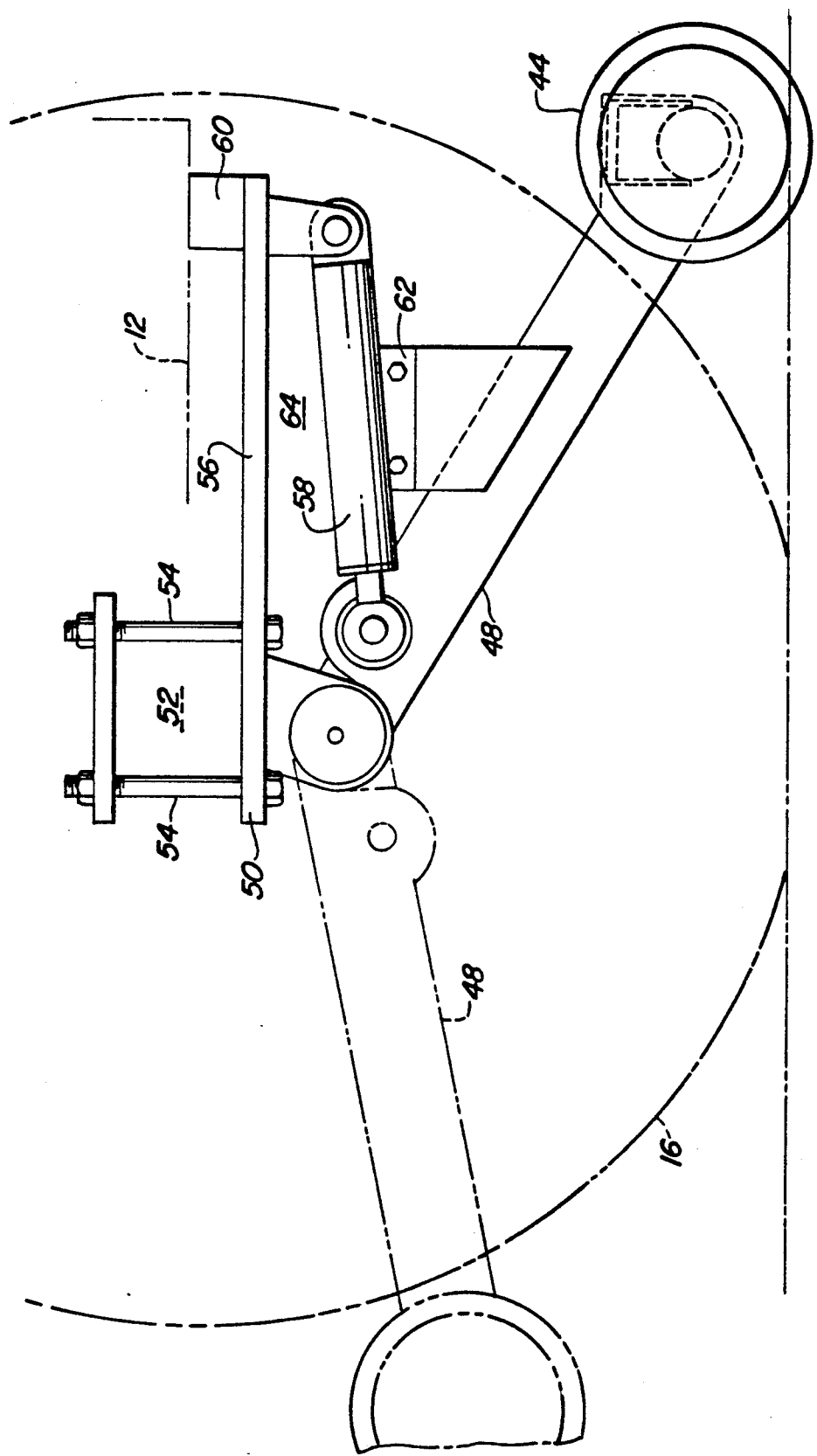
FIG. 7 is a side view of the rear rail gear.

When switching from a rail configuration, illustrated in FIG. 7, to a non-rail configuration, the stabilizer legs are extended lifting wheels 16 off the track and providing clearance for rail wheels 44. Hydraulic cylinders 58 are then extended rotating arm 48 and associated wheels 44 forwardly into a non-rail storage position located in front of main drive wheels 16, illustrated in phantom lines in FIG. 7. Similarly in switching the machine from a non-rail configuration to a rail configuration the stabilizer legs 66 are extended lifting the main drive wheels 16 off the track and hydraulic cylinders 58 are retracted pivoting arms 48 and associated wheels 44 into the rail engaging position illustrated in FIG. 7.

By locating the non-rail storage position of the rail engaging wheel forwardly of the main drive wheel 16, the rail engaging wheels do not interfere with the operation of the backhoe when it is being operated in a conventional backhoe configuration. By locating the rail engagement position behind the main drive wheels the wheel base of the loader backhoe is increased providing a more stable platform for riding the rails.

The boom 24 is pivotally coupled to the backhoe cradle 69 of the loader backhoe in a conventional manner so it can be pivoted both side-to-side and fore-and-aft. The extendible dipperstick 26 is coupled to the boom in a conventional manner. The end of the dipperstick is provided with a grapple attachment 80 for grabbing cross ties. The grapple attachment is pivotally coupled to the dipperstick in a manner identical to that of coupling a backhoe bucket to the dipperstick. The pivoting movement of the attachment is controlled by hydraulic cylinder 82 which normally controls the operation of a backhoe bucket.

The attachment is provided with an outwardly extending arm 84. At the end of the arm is a hydraulically actuated grapple 86 which is used for grabbing the tie. By pivoting the attachment on the end of the dipperstick the tie is pulled outwardly from the railbed perpendicular to the rails.

In operation an operator first drives the vehicle along the rails until he has positioned the vehicle adjacent to the tie to be removed. The operator removes the spikes from the tie. The spike removal operation can be done out of sequence before the tie is pulled from the railbed. The rail clamps are clamped to the rails and the stabilizers positioned on the railbed outside of the rails. The stabilizers are extended to lift the vehicle and the rails to provide clearance between the rails and the tie to be removed. The grapple attachment is then positioned adjacent to the tie and the grapple activated to grab the tie. By rotating the attachment on the dipperstick the tie is pulled from under the rails in a perpendicular motion to the rails.

The following claims should not be limited to the above described embodiments but should be limited solely to the claims that follow.

I claim:

1. A railway maintenance vehicle comprising:
   a supporting structure;
   a first pair of ground engaging wheels extending from the supporting structure;
   a second pair of ground engaging wheels extending from the supporting structure;
   a first railgear assembly having rail engaging wheels mounted to the supporting structure adjacent to the first pair of ground engaging wheels, the first rail gear assembly is provided with an axle on which are mounted the rail engaging wheels, the axle can be moved into a storage position where the rail engaging wheels do not contact rails of a railway track and a rail engaging position where the rail engaging wheels and a rail engaging position where the rail engaging wheels contact rails of a railway track; and
   a second railgear assembly having a pair of rail engaging wheels mounted to the supporting structure adjacent to the second pair of ground engaging wheels, the second railgear assembly is provided with an axle on which are mounted said pair of rail engaging wheels, the axle is pivotally mounted to the supporting structure so that the axle can be pivoted into a storage position wherein said pair of rail engaging wheels do not contact rails of a railway track and a rail engaging position wherein said pair of rail engaging wheels contact rails of a railway track, when the axle of the second railgear assembly is in its storage position, said pair of rail engaging wheels is positioned between one side of the first pair of ground engaging wheels and one side of the second pair of ground engaging wheels, when the axle of the second railgear assembly is in its rail engaging position, said pair of rail engaging wheels of the second railgear assembly is positioned on the other side of the second pair of ground engaging wheels.

2. A railway maintenance vehicle as defined by claim 1 wherein the vehicle comprises a wheeled tractor having steerable wheels and main drive wheels, the first pair of ground engaging wheels are the steerable wheels and the second pair of ground engaging wheels are the main drive wheels.

3. A railway maintenance vehicle as defined by claim 2 wherein the vehicle is provided with a pivotable boom pivotally coupled to the supporting structure, a pivotable dipperstick pivotally coupled to the pivotable boom, and stabilizer legs pivotally coupled to the supporting structure.

4. A railway maintenance vehicle as defined by claim 3 wherein the dipperstick is provided with an attachment having a grapple for grabbing railroad ties.

5. A railway maintenance vehicle as defined by claim 4 wherein the stabilizer legs are provided with rail clamps for clamping and lifting rails.

* * * * *

UNITED STATES PATENT AND TRADEMARK OFFICE
CERTIFICATE OF CORRECTION

PATENT NO. : 5,156,639
DATED : 20 October 1992
INVENTOR(S) : Jeffrey A. Bostrom It is certified that error appears in the above-identified patent and that said Letters Patent is hereby corrected as shown below:

Column 4, lines 22-23, delete "and a rail engaging position where the rail engaging wheels"

Signed and Sealed this

Twenty-sixth Day of October, 1993

Attest:

BRUCE LEHMAN

Attesting Officer     Commissioner of Patents and Trademarks